Patented Oct. 23, 1951

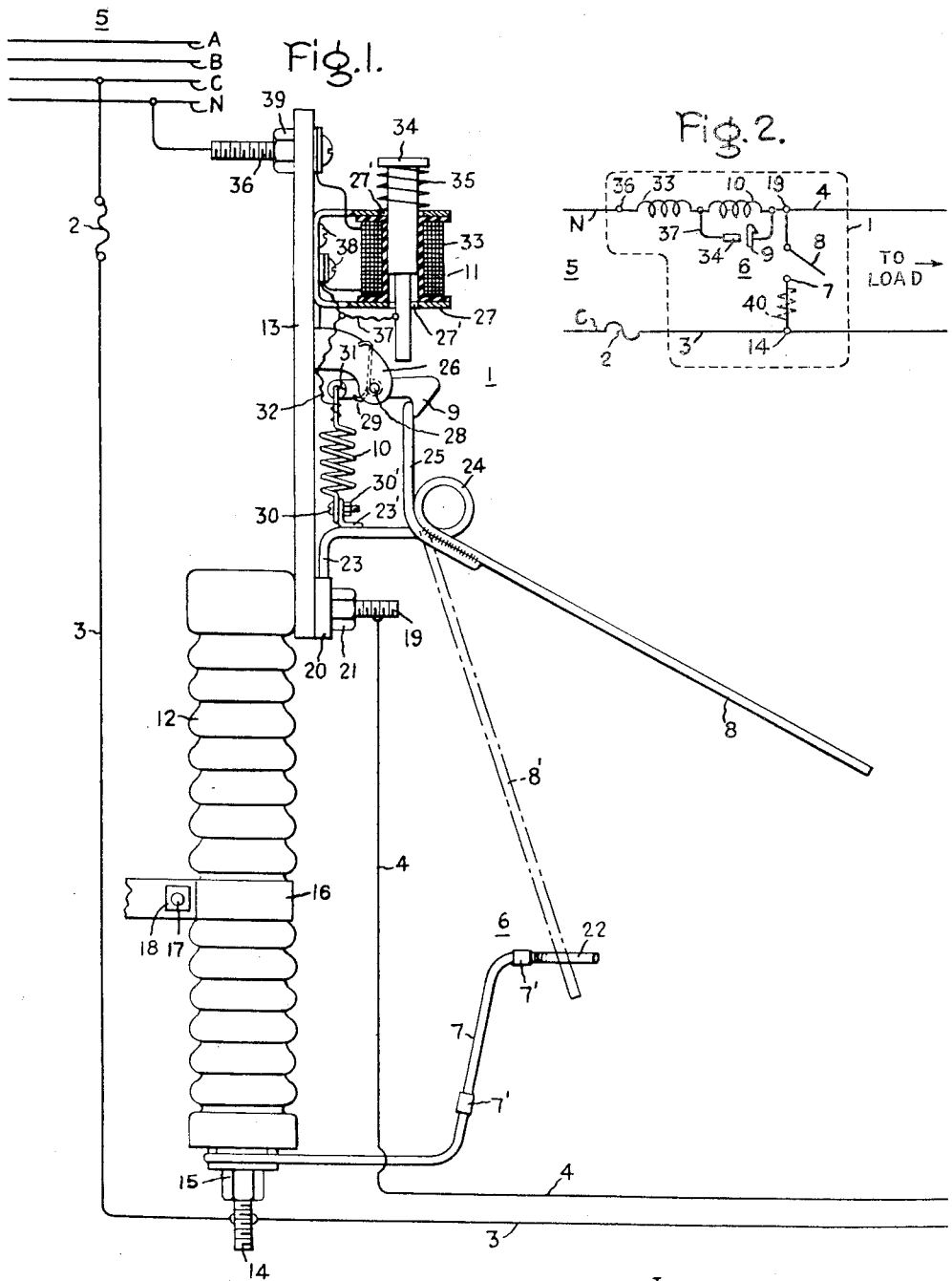

2,572,637

UNITED STATES PATENT OFFICE 2,572,637

ELECTRICAL PROTECTIVE DEVICE FOR DISTRIBUTION LINES

George F. Lincks, Pittsfield, Mass., assignor to General Electric Company, a corporation of New York Application September 1, 1949, Serial No. 113,650

3 Claims. (Cl. 175—294)

My invention relates to overcurrent protective devices of the fuseless cutout type and has as its principal object to provide a device which is particularly suitable for use in the clearing of relatively low-current faults in electrical distribution systems when such faults are of insufficient magnitude to cause normal overcurrent protective devices to operate.

In electrical distribution systems, particularly those located in rural areas, many faults of the line-to-neutral type occur, the most prevalent of such faults being that of having a line break and fall to the ground. Generally in such cases the fault current is too low to cause a fuse or other overcurrent protective device to open the circuit and yet the presence of a line at high potential on the ground is a hazard to persons and domestic animals. It is desirable, therefore, to provide a device which causes the supply circuit to be interrupted in such cases, even though there is insufficient current in the fault itself to make the normal overcurrent line protective device function to disconnect the circuit and remove the hazard.

It is an object of my invention to provide a protective device for use in a distribution system connected to a power supply, to disconnect the distribution system from the power supply under faults of a current value less than that required to cause the normal overcurrent circuit breaking device to function.

It is another object of my invention to provide a device which functions in response to relatively low-current faults but which in general is prevented from functioning at the relatively high fault currents which cause other overcurrent circuit breaking devices to function.

According to one embodiment, my invention provides an apparatus which is arranged to short-circuit the lines of a distribution system supplied from a phase wire and the neutral wire of a transmission system through an overcurrent circuit breaking device by means of a switch mechanism connected between the lines. Under normal conditions the switch is in an open position. In response to fault current in the distribution system, between a pair of predetermined values, a first current responsive element, such as a thermostatic element, is arranged to cause the switch to close. When the switch mechanism is thus closed, the lines are short-circuited causing the normal overcurrent circuit breaking device to trip, disconnecting the circuits.

Under relatively high fault currents, in excess of the predetermined values, however, a second current responsive element, such as a solenoid, is arranged to lock the switch in the open position, allowing the normal overcurrent circuit breaking device to open the circuit. The thermostatic element is arranged to be short-circuited by action of the second responsive element in response to relatively high fault currents to prevent damage to the first responsive element by the flow of high currents therethrough.

The device incorporating my invention is designed for application to a distribution system having normal protective devices such as fuse cutouts, reclosers and oil circuit breakers installed at strategic points in the system such as at the substation, sectionalizing points on the main line and at branches along the line. In the usual installation, these devices are so coordinated that the protective device closest to a fault on its source side responds to clear a fault from the circuit without causing any other protective device in the circuit to operate.

The device about to be described is connected to such a circuit to provide additional protection against faults caused by lines of the distribution circuit falling to the ground and causing such low fault currents as will not of themselves operate the normal over-current protective devices enumerated above.

The device incorporating my invention is designed to provide protection against these low current faults by responding thereto to short-circuit the lines of the distribution circuit to cause a short circuit on the primary line, indirectly causing the usual over-current devices to clear such a fault from the circuit. When overload currents of values high enough to actuate the usual over-current protective devices occur on the line, however, an open circuit between the distribution lines is maintained in this device to allow the usual over-current devices to clear the fault.

My invention will be better understood from a consideration of the following description taken in connection with the accompanying drawing and the appended claims, in which the features of my invention believed to be novel are set forth.

In the drawing Fig. 1 is an elevational view of a protective device embodying certain features of my invention, and Fig. 2 is a schematic diagram showing the electrical relationship of certain of the elements of Fig. 1.

Referring now to Fig. 1, there is shown a protective device 1 and a normal overcurrent circuit breaking device 2. Device 1 is provided with means for short circuiting lines 3 and 4 of a distribution line and is connected between line 4 and line 3 of a distribution line. Device 2 is connected between line 3 and phase C of source 5 which is represented as a conventional three-phase four-wire distribution system having phase wires A, B and C and a neutral wire N. Lines 3 and 4 represent a single-phase line connected through devices 1 and 2 to phase C and neutral N, respectively, of source 5.

Circuit breaking device 2 is represented as a fuse and because of the relatively high load currents and coordination with other protective devices located on the load side which must operate faster, device 2 is arranged to interrupt line 3 only at relatively high values of current in line 3 resulting from relatively low impedance faults.

Attention is next directed to the structure of fuseless cutout 1 which comprises principally a switch mechanism 6 having a contact 7 and a movable arm 8, a latch 9, a thermostatic element 10 and an electromagnetic element 11. The elements mentioned are assembled on a pair of insulating members 12 and 13. Insulating member 12, which is of a type suitable for the voltage of system 5, may be of conventional design and is preferably made from a ceramic material, such as porcelain. The lower end of insulator 12 is provided with a threaded lug 14 fastened therein as by cementing, and constituting a terminal of device 1. Switch contact 7 is secured to lug 14 and insulator 12 by suitable nuts 15. Lug 14 is electrically connected to wire 3.

A support for cutout device 1 is provided in the form of a strap 16 which may be formed of metal and is arranged to be clamped at the approximate center of insulator 12 by a bolt 17 and nut 18. The upper end of insulator 12 is provided with a threaded lug 19 fastened therein as by cementing, and constituting a second terminal of device 1. Insulator 13 and a supporting bar 20 for movable switch arm 8 are secured in fixed relation to lug 19 and insulator 12 by a suitable nut 21.

It will be understood that in assembling contact 7 and arm 8 of switch 6 and insulators 12 and 13, correct alignment must be maintained therebetween for proper operation and it may be desirable to employ other aligning and fastening devices in addition to lugs 14 and 19 and nuts 15 and 21 which are shown.

Switch contact 7 is formed of a doubled metallic rod or wire formed near one extremity thereof for encircling and mounting on lug 14 as previously described. Straps 7' are formed around and suitably fastened to contact 7 so as to hold the two wires in proper relationship. The other extremity of contact 7 has the wire flared out to form a fork or generally Y-shaped end 22 arranged to receive switch arm 8. Switch arm 8 is formed of a metallic rod or wire having a high degree of flexibility. One extremity 23 of arm 8 is secured by welding or otherwise to supporting bar 20 which in turn is secured to lug 19 as previously described. Spring action for moving arm 8 into engagement with contact 7 is provided by a spring loop or loops 24 formed in arm 8. The other extremity of arm 8 is extended beyond loop 24 to the required length for reliable engagement with the forked portion 22 of contact 7. The engaged position of arm 8 with contact 7 is indicated in Fig. 1 by the broken-line view of the arm designated by numeral 8'.

A holding catch 25 which is arranged to engage latch 9 is provided for arm 8 in the form of a strap welded or otherwise secured to arm 8 in the vicinity of loop 24. Latch 9 is supported by a generally U-shaped bracket 26 secured in fixed relation to insulator 13. For convenience bracket 26 may be made integral with bracket 27 which supports solenoid 11, as will be presently described. Latch 9 is supported in bracket 26 by a pin 28 extending therethrough, and latch 9 is biased in a clockwise direction by a spring 29 arranged to engage latch 9 and bracket 26. Thus switch arm 8 is maintained in a latched position by engagement of catch 25 with latch 9.

One end of thermostatic element 10 is provided with a looped end which is fastened by a screw 30 and nut 30' to a lug 23' which is electrically common with end portion 23 of arm 8. The other end of thermostatic element 10 is attached to latch 9 but is electrically insulated therefrom by a grommet 31, preferably formed of a ceramic material, interposed between latch 9 and element 10.

Thermostatic element 10 may conveniently be of the type described in Parsons U. S. Patent 2,121,259, dated June 25, 1948. Element 10 as herein embodied consists of a bimetallic material wound along a minor helix in the manner of a spring and the resulting spring-like material is then wound along a major helix, the latter being shown in Fig. 1. The bimetallic member made in this manner expands and contracts in the direction of the axis of the major helix when the temperature of the member is changed, as by passing current through the bimetallic material. Depending on the inside-outside relationship of the bimetallic materials in the minor helix, the major helix may be made either to expand or contract along its axis. In the construction shown in Fig. 1 thermostatic element 10 is arranged to contract in length upon being heated, thereby tending to pull latch 9 away from catch 25 to release arm 8.

The advantage of the particular form of thermostatic element shown is that the degree of movement produced in response to current and the accompanying force obtained with such movement is relatively great. However, it will be understood that other current responsive devices providing motion and force may be employed.

Latch 9 is formed of a conducting material, preferably metal. By the use of insulating grommet 31 between latch 9 and thermostatic element 10 a shunting effect which would otherwise be provided across thermostatic element 10 by latch 9, catch 25 and end portion 23 of arm 8 is avoided. A flexible conductor 32 is provided to conduct current from bracket 27, which is preferably metal, to thermostatic element 10.

Electromagnetic element 11 may conveniently be of solenoid construction and, as herein embodied, comprises bracket 27, a winding 33, a plunger 34 and a spring 35. Bracket 27, which is formed of a magnetic material, serves as a magnetic path for solenoid 11 and as the support therefor. Coil 33 and plunger 34 are concentrically mounted with respect to each other in suitable holes 27' in bracket 27. Plunger 34 is made electrically common with brackets 26 and 27 and the end of thermostatic element 10, which is connected to bracket 27 by the use of a flexible connector 37 between plunger 34 and bracket 27. Plunger 34, which is arranged to have a definite travel in solenoid 33, is biased to one end of its travel by spring 35, while magnetic forces due to current flowing in winding 33 tend to oppose biasing spring 35 and force plunger 34 to the opposite end of its travel.

The construction of solenoid 11 is preferably such that plunger 34 normally occupies only a position at one end or the other of its travel and thus may be considered as being a "snap-action" device. In other words, a predetermined value of current in winding 33 is required to force plunger 34 from its spring-biased position to its magnetically biased position and plunger 34 does not, except transiently, occupy intermediate positions. The relationship of solenoid 11 to latch 9 is such that when plunger 34 is in its magnetically biased position latch 9 is prevented from moving due to interference with plunger 34. Accordingly under this condition latch 9 is locked in position and electrical contact is made between latch 9 and plunger 34.

Electromagnetic element 11 operates more quickly than the protective devices mentioned above in the description of circuit breaking device 2. The solenoid provided, therefore, must have an operation time constant so much lower than that of circuit breaking device 2 that when fault currents of the relatively high range occur, plunger 34 is forced to its magnetically biased position before device 2 has time to operate.

Current from supply 5 is brought into device 1 through a lug 36 secured to insulator 13 by a suitable nut 39 and constituting a third terminal of device 1. One end of coil 33 is connected to lug 36, and the other end of coil 33 is connected to one of a pair of screws 38 which may also be employed to secure bracket 27 to insulator 13. The path of current through device 1 is from lug 36 through coil 33, bracket 26, lead 32, thermostatic element 10 and finally through portion 23 of arm 8 and lug 19 to line 4.

The electrical relationship of the elements described is shown schematically in Fig. 2 in which device 1 is represented within a closed broken line. There is an electrical path from line N and terminal lug 36 through the series combination of winding 33 and thermostatic element 10 to terminal 19 to line 4. There is an electrical path from line C through fuse 2 to terminal 14 and line 3. Arm 8 of switch is connected to terminal 19 and contact 7 is connected to terminal 14 or, in other words, switch 6 is connected between lines 3 and 4.

In considering the operation of fuseless cutout 1, if it is assumed that line 3 comes in contact with the ground, a fault current, larger in magnitude than the normal load currents in neutral line 4, yet smaller in magnitude than the current which is sufficient to melt fuse 2, tends to flow through fuse 2, lines 3 and 4 and the fault condition therein, thermostatic element 10 and winding 33 of solenoid 11. The flow of abnormal current through thermostatic element 10 causes heating and contraction thereof with subsequent releasing of catch 25 by latch 9 and the biasing of arm 8 to engagement with contact 7. In other words, switch 6 is closed by the release of arm 8 and a low impedance short circuit condition is created between lines N and C. Accordingly a relatively high short circuit current flows through fuse 2 causing it to blow, thereby interrupting the connection between lines C and 3 and clearing the fault condition.

To re-establish a normal connection between line 3 and line C following the clearing of the fault condition in the manner described and removal of the cause of the fault, switch 6 is first opened by returning arm 8 to its latched position to remove the short circuit between lines 3 and 4.

Following the opening of switch 6, fuse 2 is replaced. While no specific device is shown to aid in latching arm 8 it will be understood that this operation may be performed by an operator with a suitable lineman's stick or other device, or it may be performed by a remotely operated mechanism, such as a solenoid device.

If it is now assumed that a severe fault condition exists from phase to neutral, as might occur, for example, due to a mechanical break of line 3 allowing line 3 to fall directly on line 4, then a relatively high fault current tends to flow through line N, winding 33 and thermostatic element 10, and through fuse 2 and line C. It is assumed that the fault current under this condition is in excess of the current required to blow fuse 2. Such a current is also sufficient to cause plunger 34 of solenoid 11 to be moved from its spring-biased position to its magnetically biased position. Under this condition latch 9 is locked and arm 8 is held in its latched position preventing switch 6 from closing and short-circuiting lines 3 and 4 at device 1. Thus it will be seen that under the condition of a severe fault fuse 2 is blown by the fault current itself, thereby clearing the fault as in the previous example.

While normally the period of time between the creation of a fault condition and the blowing of fuse 2 is relatively short the high fault current flowing through thermostatic element 10 may cause damage thereto. Such damage may be prevented by shunting a portion of the fault current around thermostatic element 10. This is accomplished by electrical contact between latch 9 and plunger 34 when the latter is in its magnetically biased position. A shunt path is thus provided from screw 38 through lead 37, plunger 34, latch 9, catch 25 and end portion 23 of arm 8. While plunger 34 is maintained in its magnetically biased position a relatively large portion of the fault current which would otherwise flow entirely through thermostatic element 10 may be made to flow through the shunt path comprising the elements mentioned.

It may be found in practice that the establishment of a short circuit in a distribution system by a protective device in response to relatively low fault currents, as herein described, imposes severe duty on an associated protective circuit breaking device. In such a case it may be desirable to limit the short circuit current by providing a resistance element in series with the short-circuited lines. It will be obvious that such a resistance element may easily be included in the protective device herein embodied. For example, in the structure shown in Fig. 1 a resistance element may be inserted in series with lug 14 and contact 7 or between lug 19 and switch arm 8. Such a resistance element is indicated schematically between terminal 14 and contact 7 in Fig. 2 and is designated by numeral 40.

By the use of my invention it will be seen that an electrical protective apparatus is provided which may be employed in a distribution system to clear automatically fault conditions resulting in relatively low fault currents which generally are incapable of causing normal circuit breaking devices to operate. Furthermore, the apparatus permits the normal operation of such circuit breaking devices in response to severe faults and at the same time the apparatus is protected from damaging effects due to severe fault currents by an automatic shunting action across the sensitive element thereof.

While I have shown and described my invention as applied to a particular system of connections and as embodying various devices diagrammatically shown, it will be obvious to those skilled in the art that changes and modifications may be made without departing from my invention, and I therefore aim in the appended claims to cover all such changes and modifications as fall within the true spirit and scope of my invention.

What I claim as new and desire to secure by Letters Patent of the United States is:

1. A protective device for a transmission system including a distribution line supplied from a phase wire and a neutral wire of a transmission line comprising a disconnect device connected between said phase wire and one wire of said distribution line and responsive to current therein in excess of a first predetermined value to disconnect said two lines, a switch connected between said one wire and the other wire of said distribution line having a fixed contact connected to said one wire and a contact arm connected to said other wire and movable from a latched position into engagement with said fixed contact, said arm being biased towards engagement with said fixed contact, a latch mechanism for retaining said contact arm in open position including a thermostatic release device electrically connected to said contact arm, an electromagnetic device for locking said latch mechanism in said latched position including a coil connected between the thermostat of said release device and said neutral wire, said release device being responsive to currents therethrough above a second predetermined value to allow said arm to engage said fixed contact, said second predetermined value being lower than said first predetermined value and said electromagnetic device being operative more quickly than said disconnect device in response to currents flowing therethrough in excess of said first predetermined value to retain said arm in said latched position.

2. A protective device for a distribution line supplied by a phase wire and the neutral wire of a transmission line comprising a disconnect device connected between said phase wire and one wire of said distribution line and responsive to current therein above a first predetermined value to disconnect said lines, a switch connected between said one wire and the other wire of said distribution line having a fixed contact connected to said one wire and a switch arm connected to the other wire of said distribution line and movable from a latched position into engagement with said fixed contact, means for biasing said arm towards engagement with said fixed contact, a latch mechanism for holding said arm in said latched position including a pivoted latch element and a thermostatic element secured between said latch element and said switch arm and electrically connected to said arm, said thermostatic element being responsive to current above a second predetermined value flowing therethrough to release said switch arm, said second predetermined value being lower than said first predetermined value, an electromagnetic element having a coil connected between said neutral wire and said thermostatic element and a plunger biased from said latch, said electromagnetic element being operative more quickly than said disconnect device in response to currents therein in excess of said first predetermined value to move said plunger against said latch thereby to lock said arm in said latched position, whereby said arm responds to engage said fixed contact responsive to currents flowing in said thermostatic element between said second and first predetermined values and is retained in said latched position, responsive to currents in said distribution line above said first predetermined value.

3. A protective device for a distribution line supplied by a phase wire and the neutral wire of a transmission line comprising a disconnect device connected between said phase wire and one wire of said distribution line and responsive to current therethrough in excess of a first predetermined value to disconnect said lines, a fixed contact of a switch connected to said one wire, a contact arm of said switch connected to the other wire of said distribution line and movable from a latched position into engagement with said fixed contact, said contact arm being biased towards engagement with said fixed contact, a latch mechanism including a pivoted latch element for retaining said arm in open position and a thermostatic element secured between said latch element and said switch arm and electrically connected to said switch arm, said thermostatic element being responsive to currents in excess of a second predetermined value flowing therethrough to release said arm, said second predetermined value being lower than said first predetermined value, an electromagnetic element having a coil electrically connected between said neutral wire and said thermostatic element and having a plunger biased away from said latch, said electromagnetic element being operative more quickly than said disconnect device in response to currents in excess of said first predetermined value flowing in said coil to move said plunger against said latch thereby to lock said arm in said latched position, said plunger being electrically connected to said coil to provide an alternate electric path through said latch and said arm in said locked position, whereby said arm is unlatched to short circuit said distribution line responsive to currents in said thermostatic element between said first and second predetermined values, and said arm is locked in latched position responsive to currents in said neutral wire above said first predetermined value.

GEORGE F. LINCKS.

REFERENCES CITED

The following references are of record in the file of this patent:

UNITED STATES PATENTS

| Number | Name | Date |
|---|---|---|
| Re. 22,872 | Matthews | Apr. 29, 1947 |
| 1,253,207 | Brown | Jan. 15, 1918 |
| 1,405,455 | Spurk | Feb. 7, 1922 |
| 1,919,895 | Luthi | July 25, 1933 |
| 2,349,609 | Brown | May 23, 1944 |
| 2,462,212 | Mosley | Feb. 22, 1949 |

FOREIGN PATENTS

| Number | Country | Date |
|---|---|---|
| 623,438 | Germany | Dec. 5, 1935 |